(12) United States Patent
Sun et al.

(10) Patent No.: US 11,474,732 B2
(45) Date of Patent: Oct. 18, 2022

(54) SECURITY SYSTEM, HOST SYSTEM, AND BACKUP METHOD

(71) Applicant: Hitachi, Ltd., Tokyo (JP)

(72) Inventors: Yunde Sun, Tokyo (JP); Shunsuke Nishiyama, Tokyo (JP); Goro Kazama, Tokyo (JP); Yuri Hiraiwa, Tokyo (JP); Naoyuki Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 10 days.

(21) Appl. No.: 17/181,890

(22) Filed: Feb. 22, 2021

(65) Prior Publication Data

US 2021/0357124 A1 Nov. 18, 2021

(30) Foreign Application Priority Data

May 12, 2020 (JP) .............................. JP2020-084037

(51) Int. Cl.
*G06F 3/06* (2006.01)
*G06F 11/14* (2006.01)
*G06F 9/52* (2006.01)

(52) U.S. Cl.
CPC ............ *G06F 3/065* (2013.01); *G06F 3/0619* (2013.01); *G06F 3/0673* (2013.01); *G06F 9/526* (2013.01); *G06F 11/1469* (2013.01); *G06F 2201/82* (2013.01)

(58) Field of Classification Search
CPC ...... G06F 3/065; G06F 3/0619; G06F 3/0673; G06F 11/1469; G06F 9/526; G06F 2201/82

See application file for complete search history.

(56) References Cited

U.S. PATENT DOCUMENTS

| 8,732,121 | B1 | 5/2014 | Zorin et al. | |
| 10,146,450 | B1 * | 12/2018 | Lin | G06F 11/14 |
| 10,592,352 | B1 | 3/2020 | Tanaka et al. | |
| 2006/0101512 | A1 * | 5/2006 | Yoshida | G06Q 10/087 726/20 |
| 2008/0034019 | A1 * | 2/2008 | Cisler | G06F 11/1458 |
| 2010/0262797 | A1 * | 10/2010 | Rosikiewicz | G06F 16/10 711/E12.001 |
| 2019/0391739 | A1 * | 12/2019 | Mueller | G06F 11/1451 |
| 2021/0263809 | A1 * | 8/2021 | Zhang | G06F 21/552 |

FOREIGN PATENT DOCUMENTS

JP 2004-326522 A 11/2004

OTHER PUBLICATIONS

JPO; Office Action issued in corresponding Japanese Patent Application No. JP2020-084037; dated Apr. 15, 2022; 10 Pages with translation.

* cited by examiner

*Primary Examiner* — Jigar P Patel
(74) *Attorney, Agent, or Firm* — Procopio, Cory, Hargreaves & Savitch LLP

(57) ABSTRACT

Backup data equivalent to the maximum number of generations to be held can be secured even when backup data is locked. When locking of prohibiting overwrite of one or more storage areas is performed, a backup server prepares a new backup management table and uses the backup management table and an archive management table, which is the past backup management table, to store the backup data equivalent to the maximum number of generations to be held into a storage system.

9 Claims, 16 Drawing Sheets

FIG. 5

| 511 | 512 | 513 |
|---|---|---|
| Backup image ID | Backup date and time | Validation result |
| BK_20190307 | 2019/3/7 00:00:00 | Infection |
| BK_20190306 | 2019/3/6 00:00:00 | Restoration candidate |
| ... | ... | ... |

501 Check result table

FIG. 6

```
        {
521 ~ Policy name:policy1
522 ~ Backup management table : management table (1)
(a) 523 ~ Backup data protection area : data protection area (1)
524 ~ Archive management table:[ ]
525 ~ Archive data protection area :[ ]
        }
```

502 Integrated management settings file

```
        {
521 ~ Policy name :policy1
522 ~ Backup management table : management table (2)
(b) 523 ~ Backup data protection area : data protection area (2)
524 ~ Archive management table :[management table (1) ]
525 ~ Archive data protection area :[data protection area (1)]
        }
```

502 Integrated management settings file

```
        {
521 ~ Policy name :policy1
522 ~ Backup management table : management table (3)
(c) 523 ~ Backup data protection area : data protection area (3)
524 ~ Archive management table :[management table (1), management table (2) ]
525 ~ Archive data protection area :[data protection area (1), data protection area (2) ]
        }
```

502 Integrated management settings file

FIG. 7

| | 531 | 532 | 533 | 534 | 535 | 536 |
|---|---|---|---|---|---|---|
| | Backup image generation | Backup image ID | Backup date and time | Copy number | Locking state | Restoration date and time |
| | 1 | BK_20190304 | 2019/3/4 00:00:00 | 3 | False | |
| | 2 | BK_20190305 | 2019/3/5 00:00:00 | 4 | False | |
| | 3 | BK_20190306 | 2019/3/6 00:00:00 | 5 | False | |
| | 4 | BK_20190307 | 2019/3/7 00:00:00 | 6 | True | |
| | 5 | BK_20190308 | 2019/3/8 00:00:00 | 7 | True | |
| | 6 | BK_20190309 | 2019/3/9 00:00:00 | 8 | True | |

503 Archive management table

FIG. 8

| 541 | 542 | 543 | 544 | 545 | 546 |
|---|---|---|---|---|---|
| Backup image generation | Backup image ID | Backup date and time | Copy number | Locking state | Restoration date and time |
| 7 | BK_20190310 | 2019/3/10 00:00:00 | 3 | False | 2019/3/9 12:00:00 |
| 8 | BK_20190311 | 2019/3/11 00:00:00 | 4 | False | 2019/3/9 12:00:00 |
| 9 | BK_20190312 | 2019/3/12 00:00:00 | 5 | False | 2019/3/9 12:00:00 |
| | | | 6 | False | 2019/3/9 12:00:00 |
| | | | 7 | False | 2019/3/9 12:00:00 |
| | | | 8 | False | 2019/3/9 12:00:00 |

504 Backup management table

FIG. 9

| | 551 | 552 | 553 |
|---|---|---|---|
| | Name | Maximum number of generations to be held of backup data | Backup policy |
| | Settings 1 | 6 | Policy A |
| | Settings 2 | 6 | Policy B |

505 Archive Settings Table

FIG. 10

| Name | Maximum number of generations to be held of backup data | Backup policy |
|---|---|---|
| Settings 1 | 6 | Policy A |
| Settings 2 | 6 | Policy B |

506 Backup settings table

SECURITY SYSTEM, HOST SYSTEM, AND BACKUP METHOD

CROSS-REFERENCE TO PRIOR APPLICATION

This application relates to and claim the benefit of priority from Japanese Patent Application No. 2020-84037 filed on May 12, 2020 the entire disclosure of which is incorporated herein by reference.

BACKGROUND

This disclosure relates to a security system, a host system, and a backup method.

Some storage system backs up data in a predetermined storage area independently of a host configured to control read/write of data. This type of storage system secures, in advance, a storage area equivalent to the maximum number of generations to be held, and sequentially stores the backup data into the storage area, to thereby hold backup data equivalent to the maximum number of generations to be held. At this time, backup data older than the backup data equivalent to the maximum number of generations to be held is deleted.

Furthermore, when an incident that causes, for example, data corruption has occurred, the above-mentioned storage system may lock backup data that may have been corrupted, and restore (recover) the data based on backup data of a generation before corruption.

SUMMARY

In the above-mentioned storage system, the locked backup data may be corrupted. Thus, the locked backup data cannot serve as backup data, and is not counted as the number of generations of backup. Furthermore, the locked backup data may be held for a long period of time (e.g., several months or more) to perform forensic investigation. As a result, there is a problem in that the storage area secured in advance is occupied by data that cannot serves as backup data, and the backup data equivalent to the maximum number of generations to be held cannot be secured.

An object of this disclosure is to provide a security system, a host system, and a backup method, which are capable of securing backup data equivalent to the maximum number of generations to be held even when backup data is locked.

A security system according to one aspect of this disclosure is a security system including a storage system capable of storing backup data of a plurality of generations; and a host system configured to control the storage system, wherein the host system includes: a memory that stores management information for managing a storage area equivalent to a maximum number of generations to be held, which stores the backup data in the storage system; and a control unit configured to, when locking of prohibiting overwrite of one or more storage areas is performed, prepare the management information, which is new, as new management information, and use the new management information and old management information, which is management information stored in the memory, to store the backup data equivalent to the maximum number of generations to be held into the storage system.

According to the present invention, it is possible to secure backup data equivalent to the maximum number of generations to be held even when backup data is locked.

BRIEF DESCRIPTION OF THE DRAWINGS

FIG. 5 is a table showing an example of a check result table;

FIG. 6 is a diagram illustrating an example of an integrated management settings file;

FIG. 7 is a table showing an example of an archive management table;

FIG. 8 is a table showing an example of a backup management table;

FIG. 9 is a table showing an example of an archive settings table;

FIG. 10 is a table showing an example of a backup settings table;

DETAILED DESCRIPTION OF THE EMBODIMENT

Now, description is given of an embodiment of this disclosure with reference to the drawings.

In the following description of processing, "program" may be set as an operation subject. The program is executed by a processor (e.g., central processing unit (CPU)) to execute predetermined processing by appropriately using a storage resource (e.g., memory) and/or a communication interface device (e.g., port), and thus the processor may be set as the subject of processing. The processing described with the program serving as the subject may be set as processing that is executed by a processor or a computer including the processor.

First Embodiment

Figure 1:
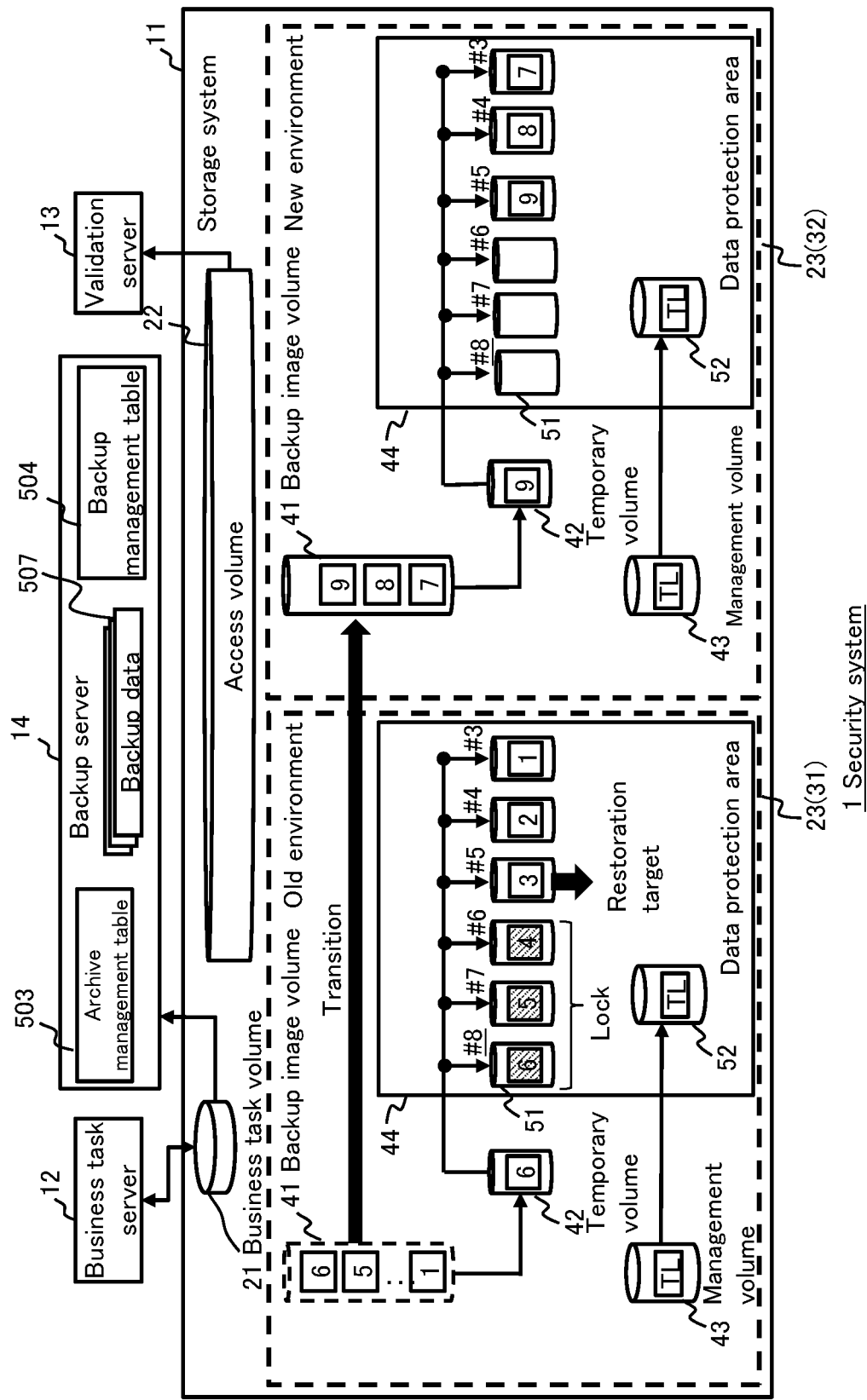
FIG. 1 is a diagram illustrating a situation of a security system according to a first embodiment of the present invention.
Figure 2:
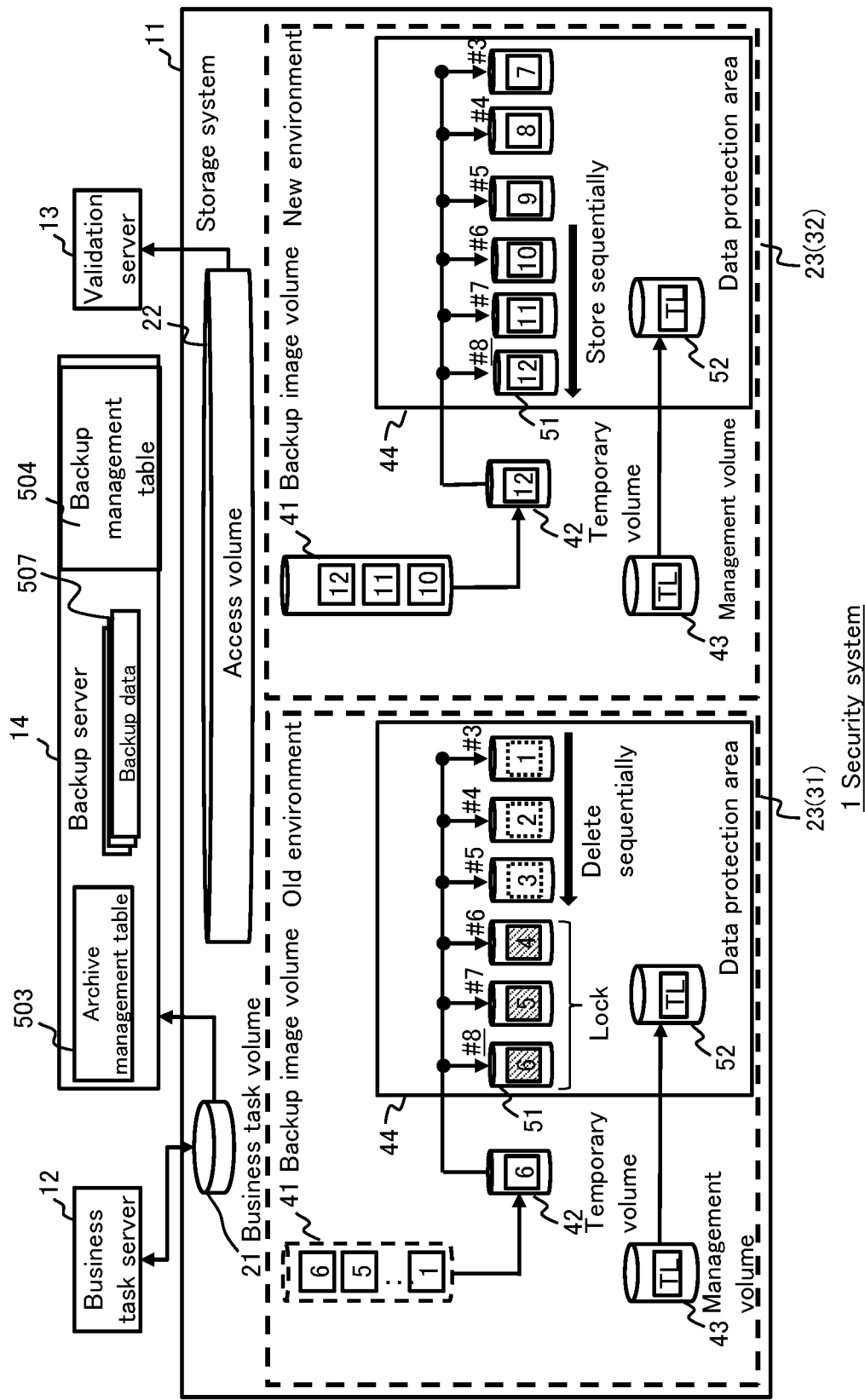
FIG. 2 is a diagram illustrating another situation of the security system according to the first embodiment of the present invention.
Figure 3:
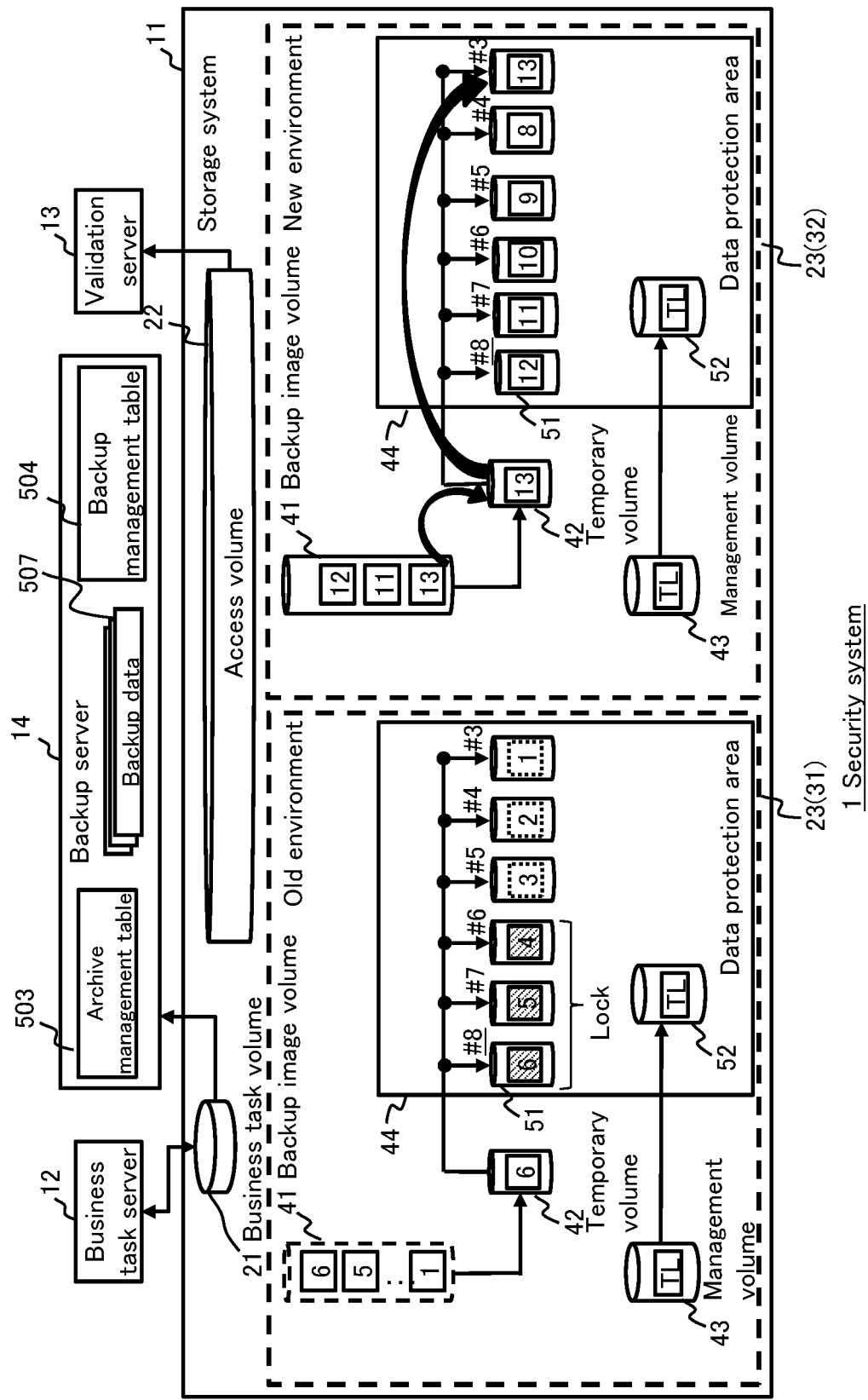
FIG. 3 is a diagram illustrating another situation of the security system according to the first embodiment of the present invention.

FIG. 1 to FIG. 3 are diagrams illustrating a security system according to a first embodiment of the present invention. The security system 1 illustrated in FIG. 1 to FIG. 3 includes a storage system 11, a business task server 12, a validation server 13, and a backup server 14.

The storage system 11 is a system that stores data. The business task server 12, the validation server 13, and the backup server 14 are a host system configured to control the storage system 11. The business task server 12 is an apparatus (host) configured to control read/write of data of the storage system 11. The validation server 13 is an apparatus configured to validate data stored in the storage system 11 at a predetermined timing, for example, when an incident that causes data corruption has occurred. The backup server 14 is a host apparatus configured to control backup of data stored in the storage system 11.

The storage system 11 includes a business task volume 21, an access volume 22, and a backup environment 23.

The business task volume 21 is a logical volume that is provided to the business task server 12 and the backup server 14. The access volume 22 is a logical volume that is provided to the validation server 13.

The backup environment 23 is an environment for backing up data stored in the storage system 11. The backup environment 23 is caused to transition to a new environment every time backup data, which is data backed up, is locked. In the example of FIG. 1 to FIG. 3, as the backup environment 23, an old environment 31, which is an environment before backup data is locked, and a new environment 32, which is an environment after the backup data is locked, are shown. Specifically, locking of backup data is processing of prohibiting overwrite of a storage area 51 (described later) that stores the backup data, and in this embodiment, locking of backup data is performed when data corruption is detected through validation by the validation server 13.

The old environment 31 and the new environment 32 each include a backup image volume 41, a temporary volume 42, a management volume 43, and a data protection area 44.

The backup image volume 41 is a logical volume that stores a backup image of data stored in the storage system 11. The backup image is created by backup software on the side of the business task server 12, for example.

The temporary volume 42 is a logical volume that is temporarily used to back up, in the data protection area 44, the backup image stored in the backup image volume 41.

The management volume 43 is a logical volume that is temporarily used to store a backup management table 504 (described later) into the data protection area 44.

The data protection area 44 is a logical area that stores backup data of data stored in the storage system 11. In this embodiment, the data protection area 44 stores a copy (duplication) of the backup image stored in the backup image volume 41. Furthermore, the data protection area 44 stores backup data equivalent to the maximum number of generations to be held, which are created at different times. The maximum number of generations to be held may be determined in advance, or may be specified by a user that uses the storage system 11, for example. In this embodiment, the maximum number of generations to be held is set to be 6, but is not limited to 6.

Specifically, the data protection area 44 includes a plurality of storage areas 51 and a storage area 52. The storage area 51 is an area that stores backup data, and one storage area 51 stores one piece of backup data. The number of storage areas 51 to be prepared is the same as the maximum number of generations to be held. Thus, there are six storage areas 51 in this embodiment. Each storage area 51 is assigned with a copy number being identification information for identifying the storage area. Copy numbers #3 to #8 are assigned to the six storage areas 51, respectively, in the example of FIG. 1. The storage area 52 is an area that stores the backup management table 504.

The backup server 14 includes the backup management table 504, an archive management table 503, and backup data 507. The backup management table 504 is management information (new management information) for managing the current (latest) backup environment 23 (new environment 32 in the example of FIG. 1).

The archive management table 503 is management information (old management information) for managing the past (old) backup environment 23 (old environment 31 in the example of FIG. 1).

The backup data 507 is backup data to be stored in the storage system 11.

In the security system 1 described above, the possibility of data corruption is detected through validation by the validation server 13, the backup data equivalent to the maximum number of generations to be held is stored into the storage system 11 by the old environment 31 under a state before data is restored, and the backup data equivalent to the maximum number of generations to be held is stored into the storage system 11 by using both of the old environment 31 and the new environment 32 under a state after data is restored.

Backed-up data for which the possibility of data corruption is detected and its subsequent backup data may be corrupted, and thus are locked. The locked backup data is not counted as the number of generations. Thus, when a related-art single backup environment is used and restoration has occurred, the number of rewritable storage areas 51 is smaller than the maximum number of generations to be held, and thus the backup data equivalent to the maximum number of generations to be held cannot be held.

In contrast, in the security system 1 in this embodiment, when restoration has occurred, the backup image volume 41 to be used is caused to transition from the old environment 31 to the new environment 32, and the backup data is stored into the storage area 51 of the new environment 32, to thereby hold the backup data equivalent to the maximum number of generations to be held. The new environment 32 may be constructed at a timing of occurrence of restoration, or may be constructed in advance.

In the example of FIG. 1, backup data of a third generation of the old environment 31 is set as a restoration target, and the storage area 51 that stores subsequent pieces of backup data of from a fourth generation to a sixth generation is locked. In this case, pieces of backup data of from a seventh generation to a ninth generation, which have been generated after locking, are stored into the storage area 51 of the new environment 32 such that the backup data equivalent to the maximum number of generations to be held is stored.

After that, as illustrated in FIG. 2, backup images of from a tenth generation to a twelfth generation are backed up in the storage area 51 of the new environment 32 sequentially. In this embodiment, the maximum number of generations to be held is 6, and thus every time each of the backup images of from the tenth generation to the twelfth generation is backed up, old backup data is deleted in order from the first generation, which is the oldest generation.

Then, as illustrated in FIG. 3, backup data of a thirteenth generation is written over the storage area 51 that stores the backup data of the seventh generation, which is the oldest generation in the new environment 32. As a result, after that, the old environment 31 is not used, and the backup data equivalent to the maximum number of generations to be held is stored only in the new environment 32.

Figure 4:
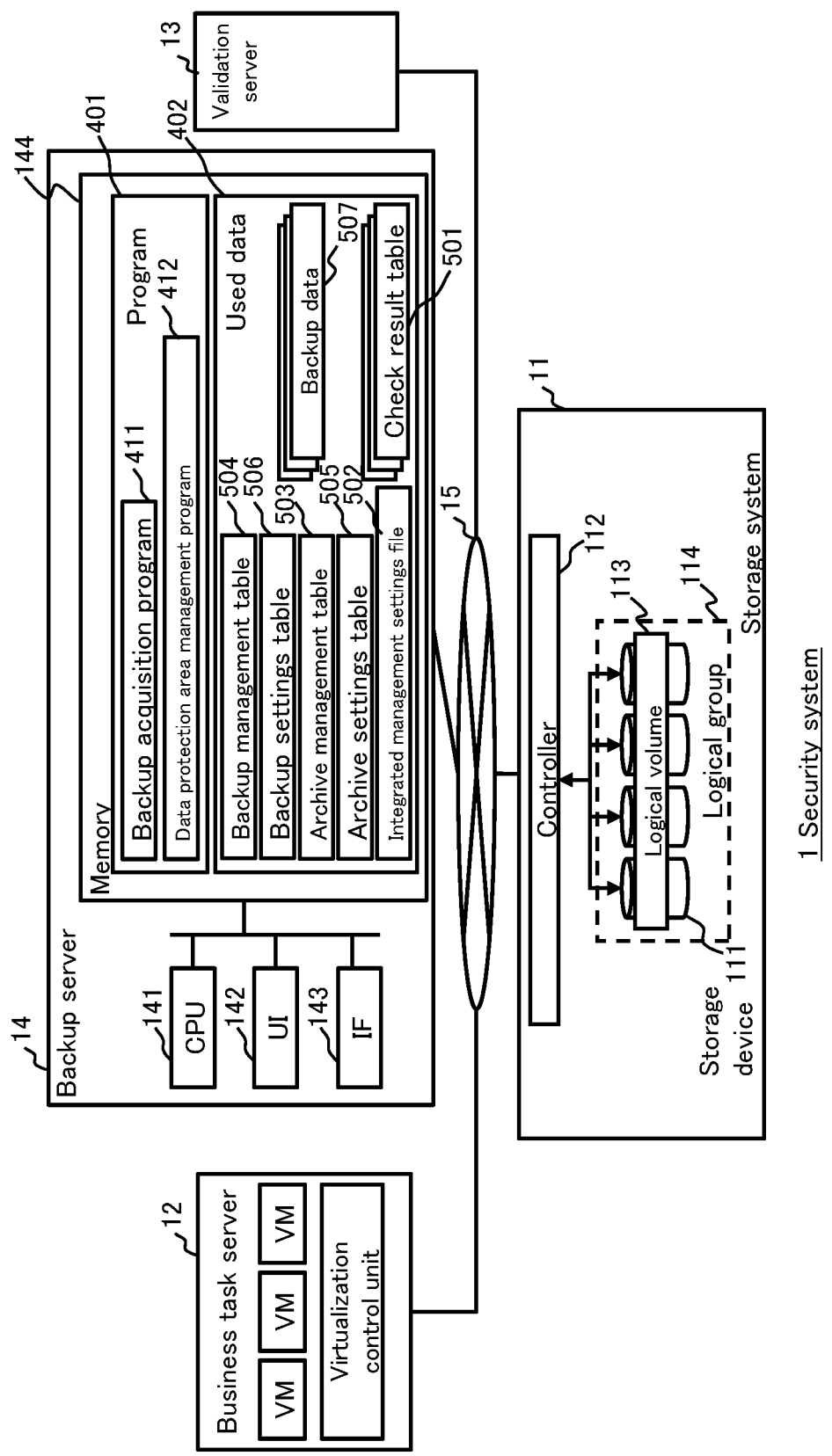
FIG. 4 is a diagram illustrating an exemplary configuration of the security system according to the first embodiment of the present invention.

FIG. 4 is a diagram illustrating a specific configuration of the security system 1 according to the first embodiment of the present invention. As illustrated in FIG. 4, in the security system 1, the storage system 11, the business task server 12, the validation server 13, and the backup server 14 are coupled to one another via a network 15.

The storage system 11 includes a storage apparatus 111 and a controller 112.

The storage apparatus 111 stores, for example, data, a backup image based on the data, and backup data being a copy of the backup image. There are a plurality of storage apparatus 111, and the plurality of storage apparatus 111 may construct a logical group 114 corresponding to one logical volume 113. Furthermore, there may be the plurality of logical groups 114. The controller 112 controls read/write of data of the storage apparatus 111.

The business task server 12 includes a virtualization control unit 121 and a plurality of virtual machines (VM) 122. The virtualization control unit 121 is configured to control the virtual machine 122. The virtual machine 122 reads/writes data of the storage apparatus 111 via the controller 112 of the storage system 11. The business task server 12 may read/write data of the storage system 11 without constructing the virtual machine 122.

The backup server 14 includes a CPU 141, a user interface (UI) 142, an interface (IF) 143, and a memory 144.

The CPU 141 is a control unit that reads a program 401 recorded in the memory 144 and executes the read program 401 to implement various kinds of functions. The UI 142 is inputted information from a user and the UI 142 outputs information to the user. The IF 403 and the storage system 11 input/output information to each other via the network 15.

The memory 144 is a recording medium that stores the program 401 defining an operation of the CPU 141 and used data 402 used in the processing executed by the CPU 141.

The program 401 includes a backup acquisition program 411 and a data protection area management program 412. The backup acquisition program 411 is a program for acquiring backup data, which is a copy of a backup image stored in the storage system 11. The data protection area management program 412 is a program for managing the backup environment 23 of the storage system 11, in particular, the data protection area 44.

The used data 402 includes a check result table 501, an integrated management settings file 502, an archive management table 503, a backup management table 504, an archive settings table 505, a backup settings table 506, and backup data 507.

FIG. 5 is a table showing an example of the check result table 501. The check result table 501 is information indicating the result of validation of data corruption for backup data by the validation server 13, and includes fields 511 to 513.

The field 511 stores a backup image ID being identification information for identifying backup data. The field 512 stores a backup date and time being a date and time (date and time of storage into protection area 44) at which the backup data is backed up. The field 513 stores the validation result. The validation result indicates, for example, "infection" indicating that the possibility of data corruption has been detected, and "restoration candidate" indicating the target of restoration. Furthermore, the validation result may indicate, for example, "non-infection" indicating that the possibility of data corruption has not been detected.

FIG. 6 is a diagram illustrating an example of the integrated management settings file 502. The integrated management settings file 502 is information for managing backup data, and includes items 521 to 525.

The item 521 indicates a policy name identifying a user policy set by the user using the storage system 11. The user policy defines, for example, the maximum number of generations to be held and an interval of backup. The user policy is recorded into the memory 144, for example, although the user policy is not shown.

The item 522 indicates the backup management table 504 for managing a current (latest) backup environment. The item 523 indicates the data protection area 44 managed under the current backup environment. The item 524 indicates the archive management table 503 for managing a past backup environment. The item 525 indicates the data protection area 44 managed under the past backup environment.

FIG. 6(a) represents an example of the integrated management settings file 502 before restoration. In the example of FIG. 6(a), there is no past backup environment, and thus the items 524 and 525 are vacant. Furthermore, the item 522 indicates "management table (1)" as the backup management table 504, and the item 523 indicates "data protection area (1)" as the data protection area 44.

FIG. 6(b) represents an example of the integrated management settings file 502 after one time of restoration. In the example of FIG. 6(b), the item 524 indicates "management table (1)" indicated by the item 522 (item 522 of FIG. 6(a)) before restoration, and the item 525 indicates "data protection area (1)" indicated by the item 523 (item 523 of FIG. 6(a)) before restoration. Furthermore, the item 522 indicates "management table (2)" as the new backup management table 504, and the item 523 indicates "data protection area (2)" as the new data protection area 44.

FIG. 6(c) represents an example of the integrated management settings file 502 after two times of restoration. In the example of FIG. 6(c), the item 524 indicates "management table (1)" and "management table (2)" indicated by the respective items 522 and 524 (items 522 and 524 of FIG. 6(b)) before two times of restoration, and the item 525 indicates "data protection area (1)" and "data protection area (2)" indicated by the respective items 523 and 525 (items 523 and 525 of FIG. 6(b)) before two times of restoration. Furthermore, the item 522 indicates "management table (3)" as the new backup management table 504, and the item 523 indicates "data protection area (3)" as the new data protection area 44.

As illustrated in FIG. 6, there is always one backup management table 504 irrespective of whether restoration is performed, and the archive management table 503 is newly added every time restoration is performed.

FIG. 7 is a table showing an example of the archive management table 503. FIG. 7 represents the archive management table 503 under the situation illustrated in FIG. 1. The archive management table 503 includes fields 531 to 536.

The field 531 stores a backup image generation, which is a backup image generation of backup data. The field 532 stores a backup image ID. The field 533 stores a backup date and time. The field 534 stores a copy number of the storage area 51 that stores the backup data. The field 535 stores a locking state of the storage area 51. The locking state indicates "True" when the storage area 51 is locked, whereas the locking state indicates "False" when the storage area 51 is not locked. The field 536 stores a restoration date and time at which restoration is performed. In this embodiment, when restoration is performed, the restoration date and time are stored into the backup management table 504 managing the backup environment after the restoration, and thus the field 536 is vacant in FIG. 7.

FIG. 8 is a table showing an example of the backup management table 504. FIG. 8 represents the backup management table 504 under the situation illustrated in FIG. 1. The backup management table 504 includes fields 541 to 546.

The field 541 stores a backup image generation. The field 542 stores a backup image ID. The field 543 stores a backup date and time. The field 544 stores a copy number. The field 545 stores a locking state of the storage area 51. The field 546 stores a restoration date and time at which restoration is performed.

The copy number, the locking state, and the restoration date and time are stored in advance for all the records at the time of preparing the backup management table 504.

FIG. 9 is a table showing an example of the archive settings table 505. The archive settings table 505 is information indicating the settings of backup in the past backup environment, and includes fields 551 to 553.

The field 551 stores a settings number identifying settings of backup. The field 552 stores the maximum number of generations to be held as the settings of backup. The field 553 stores a backup policy for backup as the settings of backup. In this embodiment, the backup policy includes "policy A" corresponding to "settings 1" and "policy B" corresponding to "settings 2".

"policy A" indicates that data is backed up in the data protection area 44 of the current backup environment (backup data is stored) when both of the following condition 1 and condition 2 are satisfied.

Condition 1: A backup image is newly created (backup image is newly stored in backup image volume 41).

Condition 2: The number of generations of a backup image to be stored in the backup image volume 41 reaches a specified number. The specified number is specified by backup software in the business task server 12, for example.

"policy B" specifies that unlocked data, which is backup data that is stored in the data protection area 44 of the past backup environment and is not locked, is deleted when the following condition 3 is satisfied.

Condition 3: A sum of the number of generations of unlocked data stored in the data protection area 44 of the past backup environment and the number of generations of backup data stored in the data protection area 44 of the current backup environment exceeds the maximum number of generations to be held.

FIG. 10 is a table showing an example of the backup settings table 506. The backup settings table 506 is the same information as that of the archive settings table 505.

Figure 11:
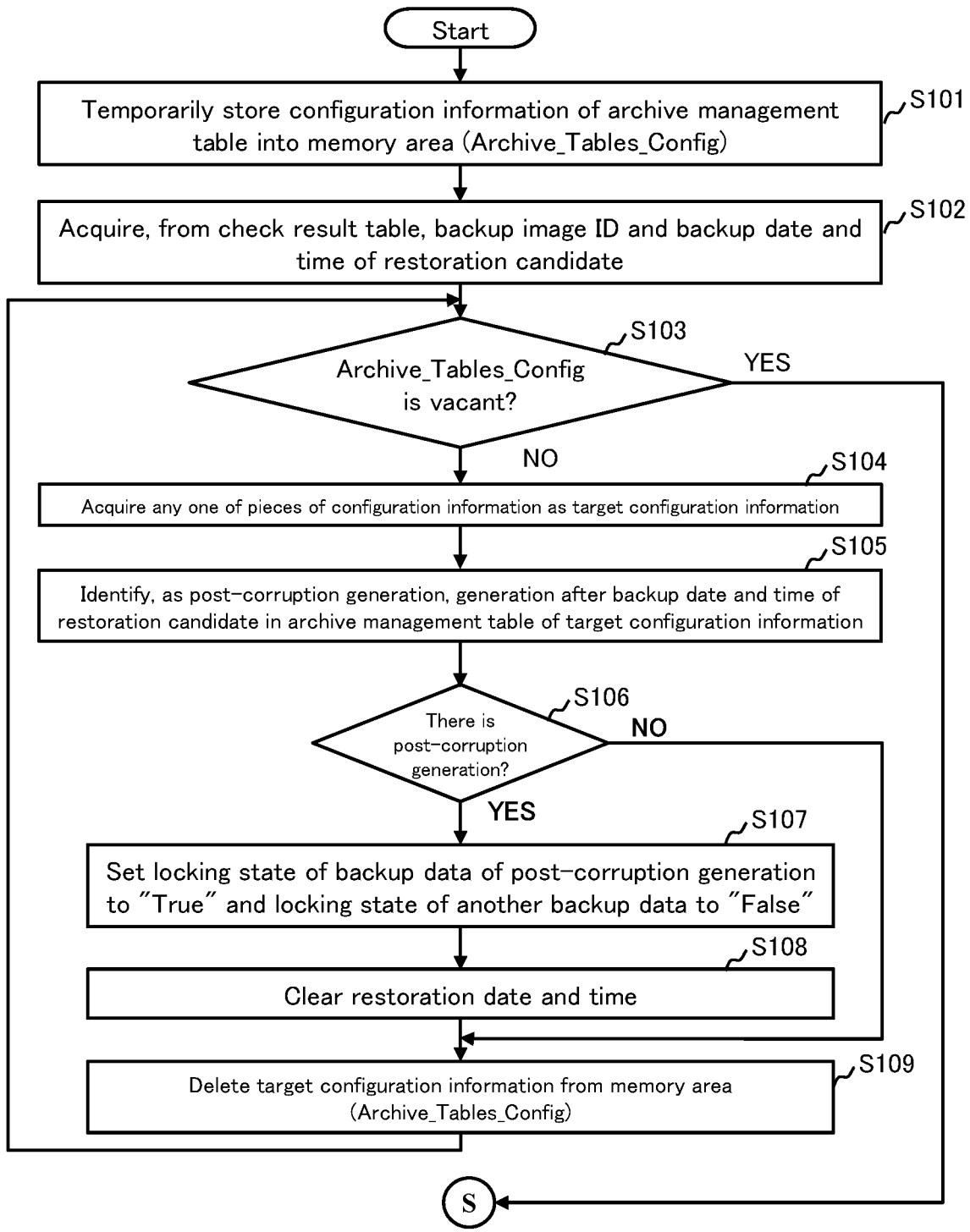
FIG. 11 is a flow chart for describing an example of preprocessing by a backup server.
Figure 12:
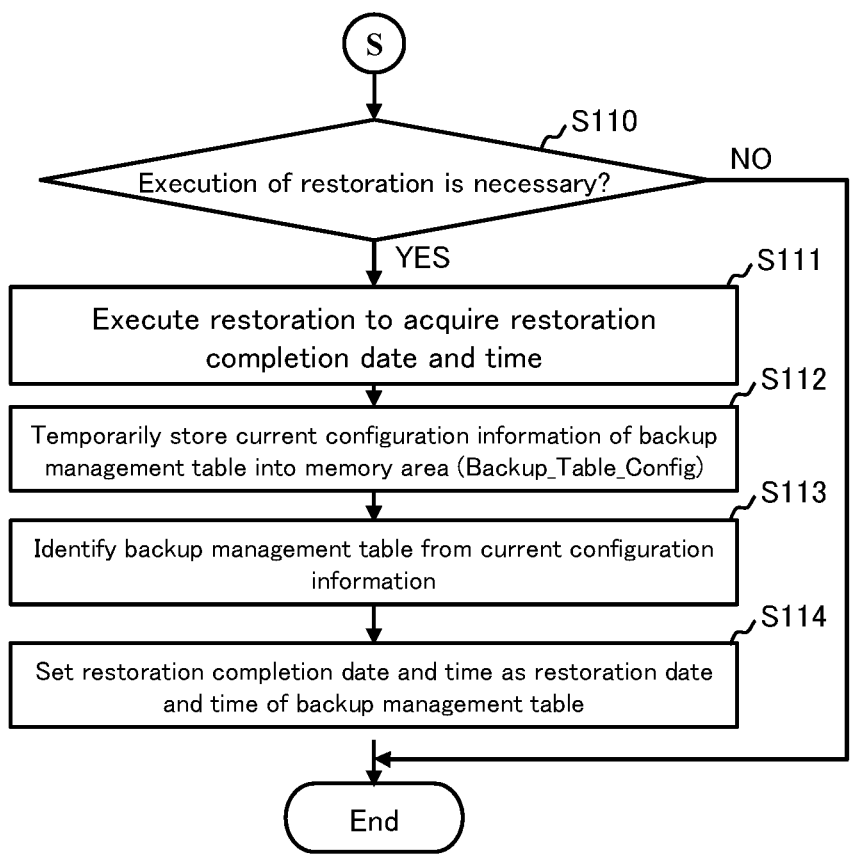
FIG. 12 is a flow chart for describing an example of the preprocessing by the backup server.
Figure 13:
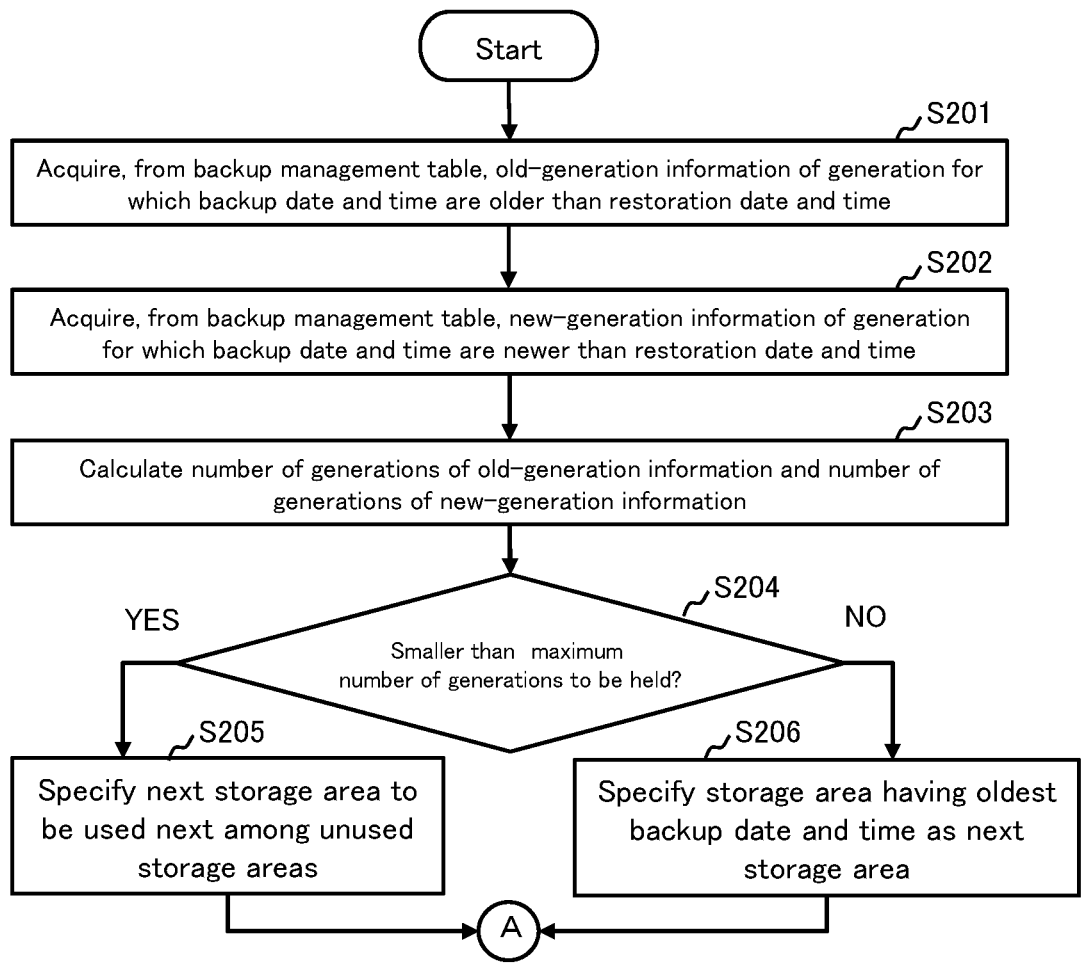
FIG. 13 is a flow chart for describing an example of backup processing by the backup server.
Figure 14:
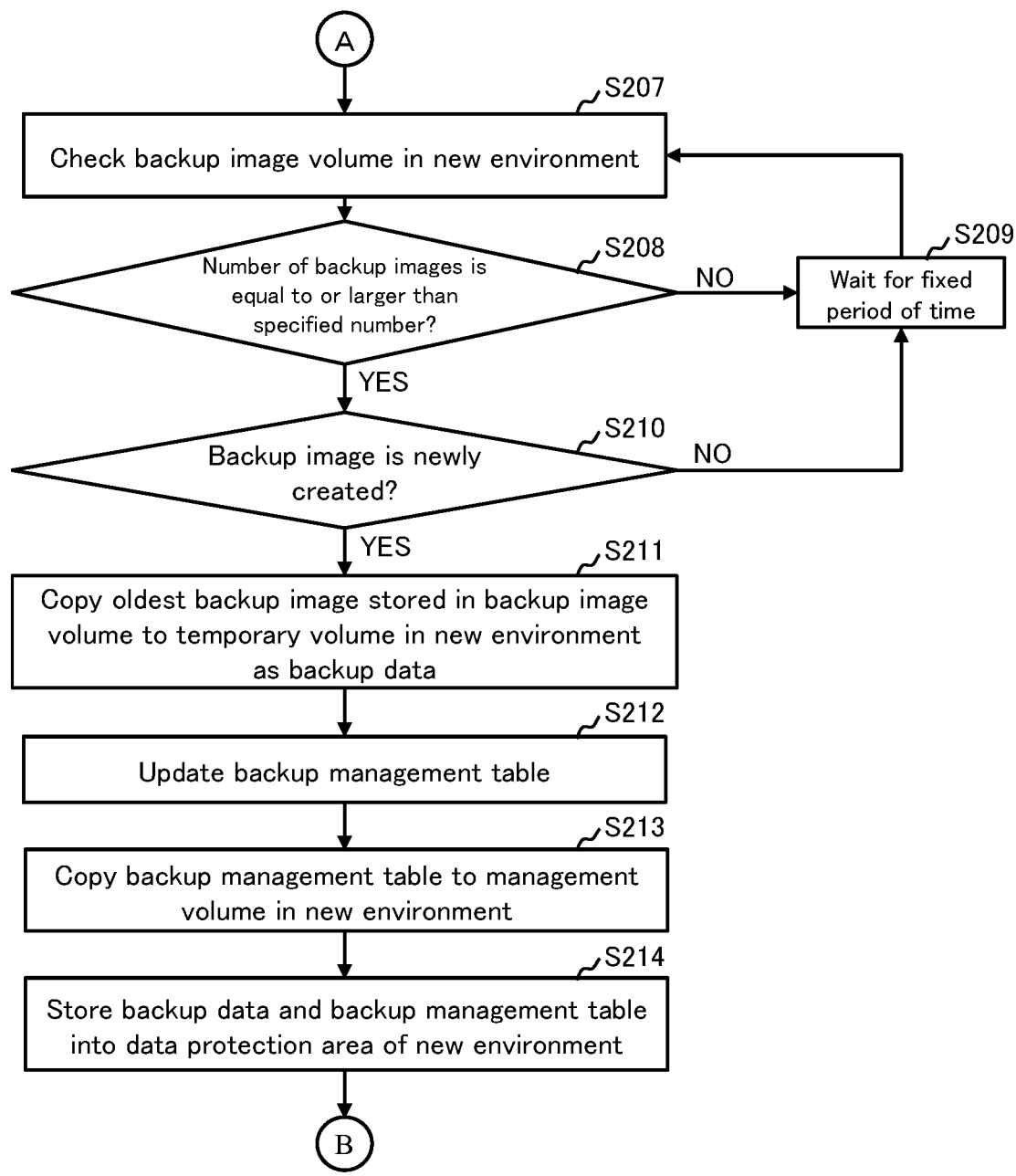
FIG. 14 is a flow chart for describing an example of the backup processing by the backup server.
Figure 15:
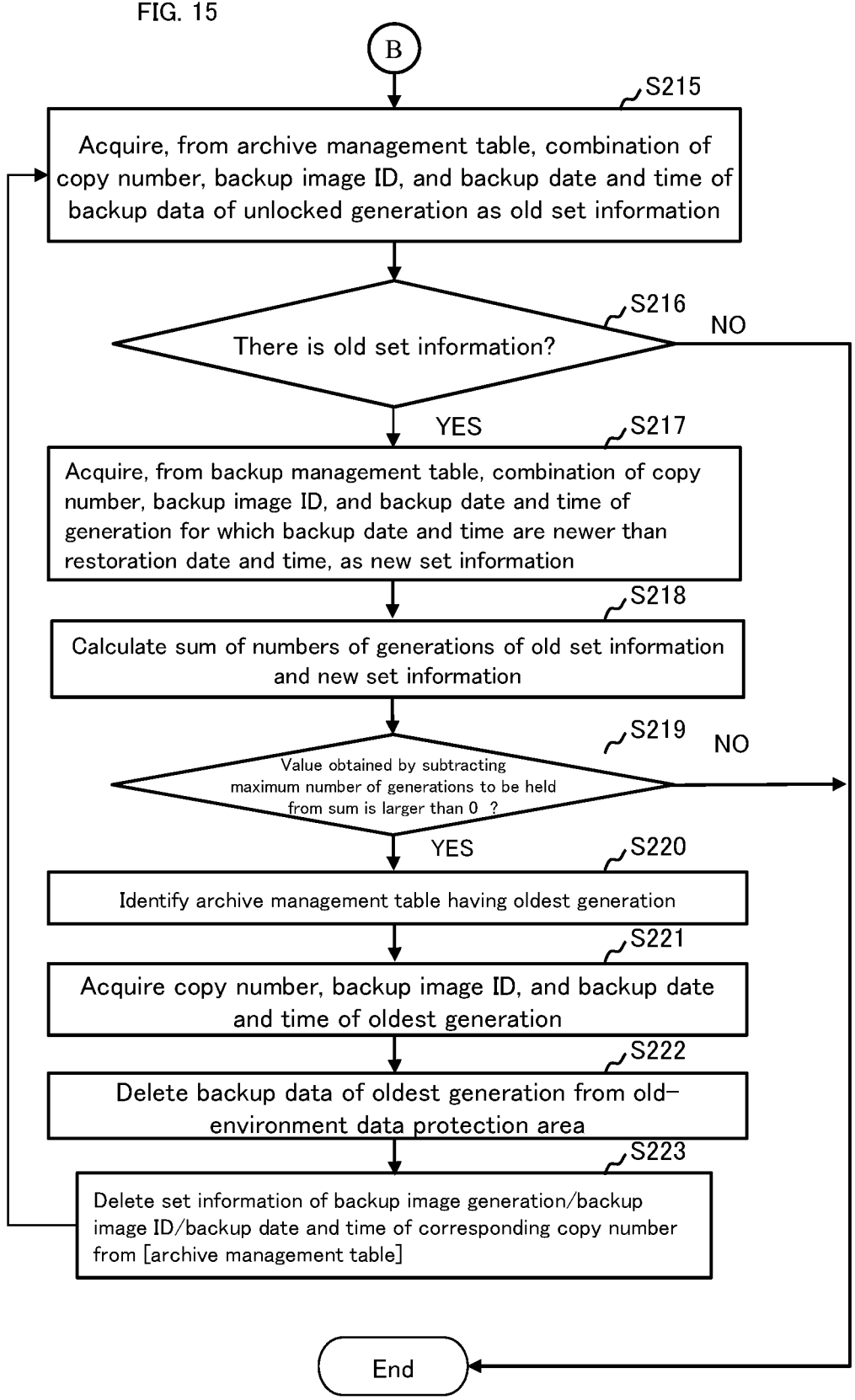
FIG. 15 is a flow chart for describing an example of the backup processing by the backup server.

FIG. 11 to FIG. 15 are each a flow chart for describing an example of processing by the backup server 14. Specifically, FIG. 11 and FIG. 12 are flow charts for describing preprocessing for executing (resuming) backup processing, and FIG. 13 to FIG. 15 are flow charts for describing an example of the backup processing. The backup processing is executed during operation of the storage system 11, for example.

In the preprocessing, the data protection area management program 412 first acquires information indicating each archive management table 503 from the integrated management settings file 502 as configuration information, and stores the configuration information into a predetermined memory area (Archive_Tables_Config) of the memory 144 (Step S101).

The data protection area management program 412 acquires, from the check result table 501, the backup image ID and the backup date and time of backup data of a restoration candidate (Step S102).

The data protection area management program 412 determines whether the memory area is vacant (Archive_Tables_Config) (Step S103).

When the memory area (Archive_Tables_Config) is not vacant, the data protection area management program 412 acquires any one of pieces of configuration information stored in the memory area (Archive_Tables_Config) as target configuration information, and identifies the archive management table 503 indicated by the target configuration information as the target archive management table 503 (Step S104). For example, the data protection area management program 412 acquires configuration information having the smallest index, which is not shown, for identifying configuration information.

The data protection area management program 412 checks the backup and date and time of each backup image generation in the target archive management table 503, and identifies, as a post-corruption generation, a backup image generation of a backup date and time newer than the backup date and time of the restoration candidate (Step S105).

The data protection area management program 412 determines whether there is one or more post-corruption generations (Step S106).

When there is a post-corruption generation, the data protection area management program 412 determines that update of the archive management table 503 is necessary, and sets the locking state of backup data of the post-corruption generation to "True" and the locking state of backup data of another backup data generation to "False" in the target archive management table 503 (Step S107).

The data protection area management program 412 clears all the restoration date and times in the target archive management table 503 (Step S108).

The data protection area management program 412 deletes the target configuration information from the memory area (Archive_Tables_Config) (Step S109), and returns to the processing of Step S103.

In the above-mentioned processing, when there is no post-corruption generation in Step S106, the data protection area management program 412 skips the processing of Step S107 and Step S108.

Furthermore, in Step S103, when the memory area (Archive_Tables_Config) is vacant, the data protection area management program 412 determines whether restoration based on the backup data of the restoration candidate is necessary (Step S110 of FIG. 12).

For example, when the validation server 13 has executed validation and the possibility of data corruption has occurred, the data protection area management program 412 determines that restoration based on the backup data of the restoration candidate is necessary. Even when it is first detected that there is no possibility of data corruption, the possibility of data corruption may be detected as a result of detailed validation after that. Also in this case, restoration is performed. Furthermore, a restoration target may be replaced with a backup image of a newer generation as the result of detailed validation. Also in this case, restoration is performed based on the new restoration target.

When restoration is not necessary, the data protection area management program 412 finishes the processing. On the other hand, when restoration is necessary, the data protection area management program 412 executes restoration based on the backup data of the restoration candidate, and acquires the restoration date and time at the time of execution of restoration as a restoration completion date and time (Step S111).

The data protection area management program 412 acquires, from the integrated management settings file 502, information indicating the backup management table 504 as current configuration information, and stores the current configuration information into a predetermined memory area (Backup_Tables_Config) of the memory 144 (Step S112).

The data protection area management program 412 acquires the current configuration information stored in the memory area (Backup_Tables_Config), and identifies the backup management table 504 indicated by the current configuration information (Step S113).

The data protection area management program 412 sets the restoration completion date and time as each restoration date and time of the identified backup management table 504 (Step S114), and finishes the preprocessing.

Next, description is given of an example of backup processing with reference to FIG. 13 to FIG. 15.

First, the backup acquisition program 411 acquires, from the backup management table 504, information (record) of a generation for which the backup date and time are older than the restoration date and time as old-generation information, and temporarily stores the information into a predetermined memory area (New_Fort_Invalid) of the memory 144 (Step S201 of FIG. 13).

The backup acquisition program 411 acquires, from the backup management table 504, information of a generation for which the backup date and time are newer than the restoration date and time as new-generation information, and temporarily stores the information into a predetermined memory area (New_Fort_Valid) of the memory 144 (Step S202).

The backup acquisition program 411 calculates, as the number of current generations, a sum of the number of generations of backup data included in the old-generation information and the number of generations of backup data included in the new-generation information (Step S203).

The backup acquisition program 411 compares the number of current generations with the maximum number of generations to be held, and determines whether the number of current generations is smaller than the maximum number of generations to be held (Step S204).

When the number of current generations is smaller than the maximum number of generations to be held, the backup acquisition program 411 selects the smallest copy number among copy numbers of unused storage areas of the backup management table 504, and specifies a storage area corresponding to the selected copy number as a next storage area that stores next backup data (Step S205).

When the number of current generations is equal to or larger than the maximum number of generations to be held, the backup acquisition program 411 selects a copy number having the oldest backup date and time in the backup management table 504, and specifies a storage area corresponding to the selected copy number as a next storage area (Step S206).

After that, the backup acquisition program 411 checks the backup image volume 41 in the current backup environment (Step S207), and determines whether there is a specified number or more of backup images (Step S208).

When there is no specified number or more of backup images, the backup acquisition program 411 waits for a fixed period of time (Step S209), and returns to the processing of Step S207.

On the other hand, when there is a specified number or more of backup images, the backup acquisition program 411 determines whether a backup image is newly created and stored in the backup image volume 41 (Step S210).

When a backup image is not newly created, the backup acquisition program 411 waits for the fixed period of time (Step S209), and returns to the processing of Step S207.

On the other hand, when a backup image is newly created, the backup acquisition program 411 copies the oldest backup image among backup images stored in the backup image volume 41 in the current backup environment to the temporary volume 42 in the current backup environment as backup data. Then, the backup acquisition program 411 acquires the backup image ID and backup date and time of the copied backup data (Step S211).

The backup acquisition program 411 stores the backup image ID and the backup date and time acquired in Step S211 into the fields 542 and 543 corresponding to the copy number selected in Step S205 or Step S206 in the backup management table 504, respectively (Step S212). When backup data is already stored in the storage area of the selected copy number, that is, when the backup image ID and the backup date and time are already stored in the fields 542 and 543, respectively, the backup acquisition program 411 writes the backup image ID and the backup date and time acquired in Step S211 over the backup image ID and the backup date and time.

The backup acquisition program 411 copies the backup management table 504 to the management volume 43 in the current backup environment (Step S213). The backup acquisition program 411 may copy a part of the backup management table 504 updated in Step S212.

The backup acquisition program 411 stores image data copied to the temporary volume 42 into the storage area 51 specified as the next storage area, and stores the backup management table 504 copied to the management volume 43 into the storage area 52 (Step S214).

After that, the data protection area management program 412 acquires, from all the archive management tables 503, all the combinations of the copy number, the backup image ID, and the backup date and time of backup data of a generation for which the locking state is "False", as old set information, and temporarily stores the old set information into a predetermined memory area (Old_Fort_Valid) of the memory 144 (Step S215 of FIG. 15).

The data protection area management program 412 determines whether the memory area (Old_Fort_Valid) stores set information (Step S216).

When there is no old set information, the data protection area management program 412 finishes the backup processing. On the other hand, when there is old set information, the data protection area management program 412 acquires, from the backup management table 504, all the combinations of the copy number, the backup image ID, and the backup date and time of backup data for which the backup date and time are newer than the restoration date and time, as new set information, and temporarily stores the new set information into a predetermined memory area (New_Fort_Valid) of the memory 144 (Step S217).

The data protection area management program 412 calculates a sum of the number of generations of old set information stored in the memory area (Old_Fort_Valid) and the number of generations of new set information stored in the memory area (New_Fort_Valid) (Step S218).

The data protection area management program 412 compares the sum of the numbers of generations with the maximum number of generations to be held, and determines whether a subtraction result obtained by subtracting the maximum number of generations to be held from the sum of the numbers of generations is larger than 0 (Step S219).

When the subtraction result is equal to or smaller than 0, the data protection area management program 412 finishes the backup processing. On the other hand, when the subtraction result is larger than 0, the data protection area management program 412 identifies the archive management table 503 having the oldest backup image generation among all the archive management tables 503 (Step S220).

The data protection area management program 412 acquires, from the identified archive management table 503, a combination of the copy number, the backup image ID, and the backup date and time of backup data of the oldest backup image generation, as oldest set information (Step S221).

The data protection area management program 412 deletes, from the past backup environment, backup data corresponding to the oldest set information, and deletes the oldest set information from the old set information of the memory area (Old_Fort_Valid) (Step S222).

The data protection area management program 412 deletes, from the identified archive management table 503, the backup image generation, the backup image ID, and the backup date and time corresponding to the oldest set information (Step S223), and returns to the processing of Step S216.

According to this embodiment described above, when locking of prohibiting overwrite of one or more storage areas 51 is performed, the backup server 14 prepares the new backup management table 504, and uses the backup management table 504 and the archive management table 503 being the past backup management table 504 to store backup data equivalent to the maximum number of generations to be held into the storage system 11. Thus, even when backup data is locked, it is possible to secure backup data equivalent to the maximum number of generations to be held.

Furthermore, according to this embodiment, every time new backup data is created, the backup server 14 stores the new backup data into the storage area 51 managed by the backup management table 504. As a result, the newly generated backup data can be backed up in the new backup environment, and thus it is easy to manage the data.

Furthermore, in this embodiment, when the number of generations of stored backup data exceeds the maximum number of generations to be held, backup data of the oldest generation is deleted or overwritten. Thus, it is possible to open the storage area 51 appropriately.

Furthermore, in this embodiment, the backup server 14 generates a copy of a backup image created by the business task server 12 in the storage system 11 as backup data. As a result, the backup data can be generated independently of the business task server 12, and thus it is possible to improve the security.

OTHER EMBODIMENTS

The security system 1 may execute processing (preprocessing and backup processing) for the storage system 11 via another storage system or storage apparatus.

Figure 16:
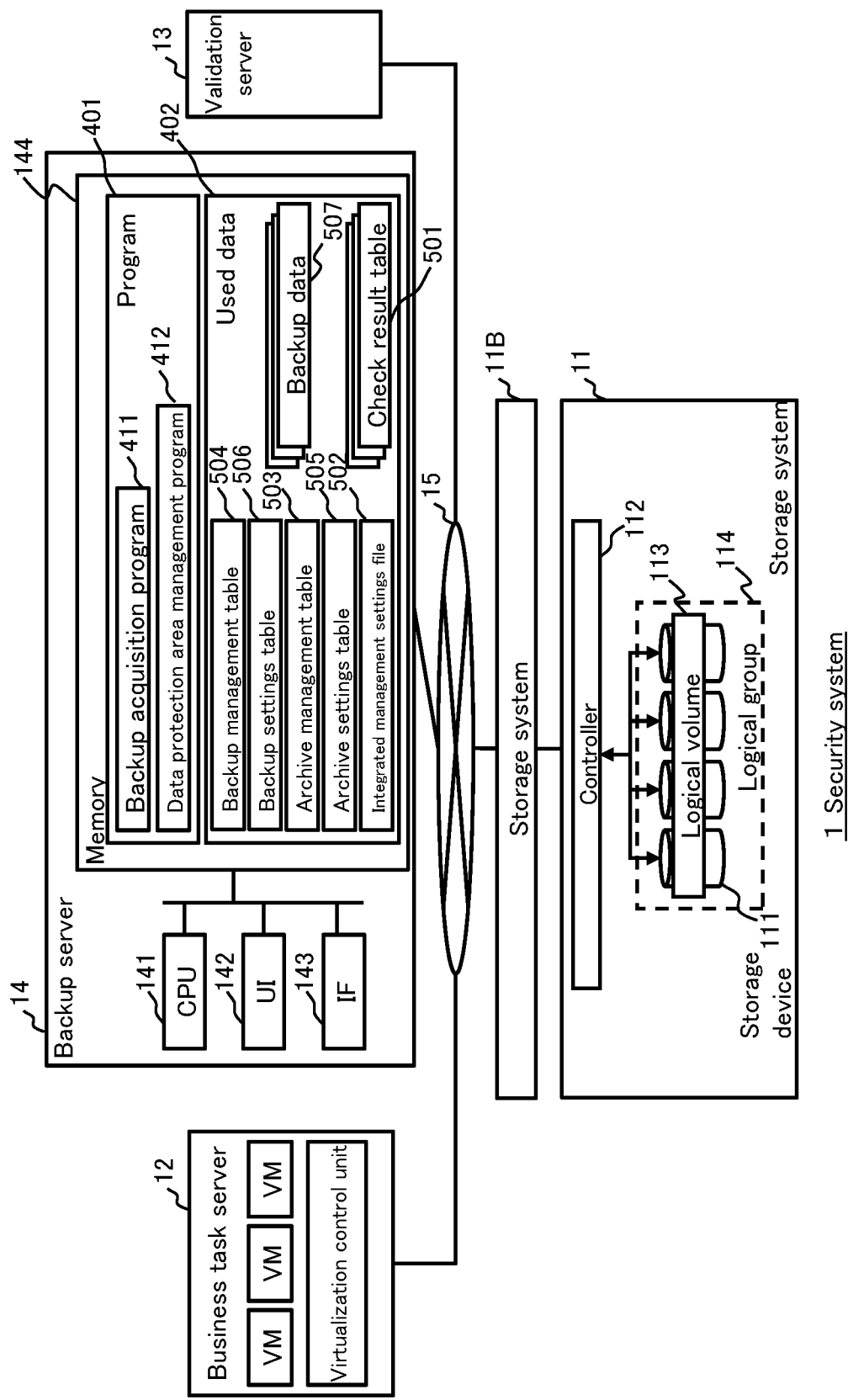
FIG. 16 is a diagram illustrating an exemplary configuration of a security system according to another embodiment of the present invention.

FIG. 16 is a diagram illustrating a mode in which the security system 1 executes the processing for the storage system 11 via another storage system. The security system 1 illustrated in FIG. 16 is different from the security system 1 in the first embodiment illustrated in FIG. 4 in that a storage system 11B is newly included. Furthermore, the security system 1 executes processing for the storage system 11 via the storage system 11B. The storage system 11B may have a function similar to that of the storage system 11.

The above-mentioned embodiments of this disclosure are examples for describing this disclosure, and are not meant to limit the scope of this disclosure only to those embodiments. A person skilled in the art can implement this disclosure in various kinds of modes without departing from the scope of this disclosure.

What is claimed is:

1. A security system, comprising:
   a storage system capable of storing backup data of a plurality of generations; and
   a host system configured to control the storage system,
   wherein the host system includes:
      a memory configured to store management information for managing a storage area equivalent to a maximum number of generations to be held, the storage area storing the backup data in the storage system; and
      a controller, when locking of prohibiting overwrite of one or more storage areas is performed, preparing the management information which is new as new management information, and using the new management information and old management information which is management information stored in the memory, to store the backup data equivalent to the maximum number of generations to be held into the storage system, and
   wherein locked backup storage areas, based on the locking of prohibiting overwrite, are excluded in counting the maximum number of generations.

2. The security system according to claim 1, wherein, when the new management information is prepared, the controller stores the new backup data into a storage area managed by the new management information every time the new backup data is created.

3. The security system according to claim 2, wherein, when a number of stored generations, being a sum of a number of pieces of backup data stored in an unlocked storage area which is managed by the old management and which is a storage area that is not locked and a number of pieces of backup data stored in a storage area managed by the new management information exceeds the maximum number of generations to be held, the controller deleting backup data of an oldest generation among the pieces of backup data stored in the unlocked storage area.

4. The security system according to claim 3, wherein, when all the pieces of backup data stored in the unlocked storage area are deleted, the controller overwriting the new backup data over the backup data of the oldest generation among the pieces of backup data stored in the storage area managed by the new management information.

5. The security system according to claim 1, wherein the host system includes a host apparatus configured to validate the backup data, and
   wherein the controller locks a storage area that stores backup data of a generation after backup data for which a possibility of data corruption is detected through validation by the host apparatus, and restore data based on backup data of a generation older than the generation of the backup data.

6. The security system according to claim 1, wherein the host system includes a host apparatus configured to control read/write of data of the storage system,
   wherein the host apparatus is configured to create a backup image of the data and store the backup image into the storage system, and
   wherein the controller generates a copy of the backup image as the backup data.

7. The security system according to claim 1, wherein the host system is configured to control the storage system via another storage system.

8. A host system configured to control a storage system capable of storing backup data of a plurality of generations, the host system comprising:
- a memory configured to store management information for managing a storage area equivalent to a maximum number of generations to be held, which stores the backup data in the storage system; and
- a controller, when locking of prohibiting overwrite of one or more storage areas is performed, preparing the management information which is new as new management information, and using the new management information and old management information which is management information stored in the memory, to store the backup data equivalent to the maximum number of generations to be held into the storage system,
- wherein locked backup storage areas, based on the locking of prohibiting overwrite, are excluded in counting the maximum number of generations.

9. A backup method to be executed by a security system including: a storage system capable of storing backup data of a plurality of generations; and a host system configured to control the storage system, the backup method comprising:
- storing, into a memory, by the host system, management information for managing a storage area equivalent to a maximum number of generations to be held, which stores the backup data in the storage system;
- preparing, by the host system, when locking of prohibiting overwrite of one or more storage areas is performed, the management information, which is new, as new management information; and
- using, by the host system, the new management information and old management information, which is management information stored in the memory, to store the backup data equivalent to the maximum number of generations to be held into the storage system,
- wherein locked backup storage areas, based on the locking of prohibiting overwrite, are excluded in counting the maximum number of generations.

* * * * *